United States Patent [19]
Tarlow et al.

[11] Patent Number: 4,776,489
[45] Date of Patent: Oct. 11, 1988

[54] AUTOMATIC SPICE AND HERB DISPENSER

[75] Inventors: Kenneth A. Tarlow, Playa del Rey, Calif.; Brad Ridgley, 16881 Oak View Dr., Encino, Calif. 91436

[73] Assignee: Brad Ridgley, Encino, Calif.

[21] Appl. No.: 34,790

[22] Filed: Apr. 3, 1987

[51] Int. Cl.$^4$ .............................................. B67D 5/60
[52] U.S. Cl. .................... 222/132; 222/196.1; 222/246; 222/450; 366/256
[58] Field of Search .............. 222/161, 200, 243, 245, 222/129, 132, 196, 450, 424.5, 565, 560, 561, 480, 196.1, 181, 244, 246, 226, 228; 366/255, 256, 276, 332; 221/204

[56] References Cited

U.S. PATENT DOCUMENTS

| | | | |
|---|---|---|---|
| 529,528 | 11/1894 | Goff | 222/129 X |
| 531,599 | 12/1894 | Ross et al. | 222/245 |
| 1,219,846 | 3/1917 | Nelson | 222/450 X |
| 1,337,789 | 4/1920 | Nicholas | 222/246 |
| 2,139,116 | 12/1938 | Geist | 222/560 |
| 2,610,726 | 9/1952 | Howard | 222/162 X |
| 4,530,448 | 7/1985 | Ponyicky | 222/181 |

FOREIGN PATENT DOCUMENTS

| | | | |
|---|---|---|---|
| 638244 | 3/1962 | Canada | 222/129 |
| 6406530 | 12/1964 | Netherlands | 221/204 |

Primary Examiner—Joseph J. Rolla
Assistant Examiner—Kenneth Noland
Attorney, Agent, or Firm—Poms, Smith, Lande & Rose

[57] ABSTRACT

An automatic spice and herb dispenser including a plurality of separate independent compartments, each compartment including an upper spice and herb storage chamber and a lower dispensing chamber. A vibrator is disposed in each upper chamber for breaking up any spices and herbs therein. A measured dispenser is provided at the bottom of each lower chamber for receiving broken up herbs and spices therein.

18 Claims, 4 Drawing Sheets

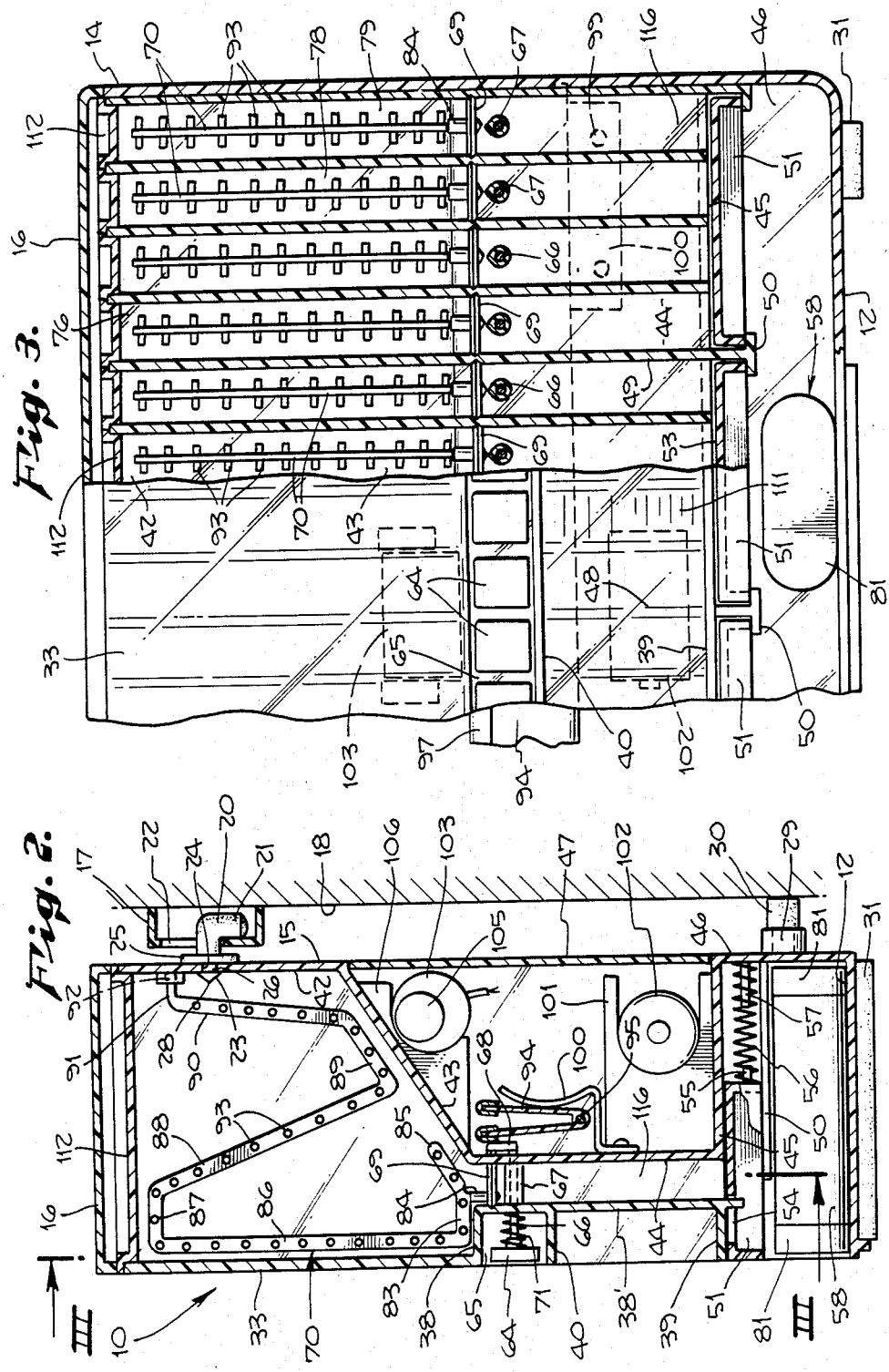

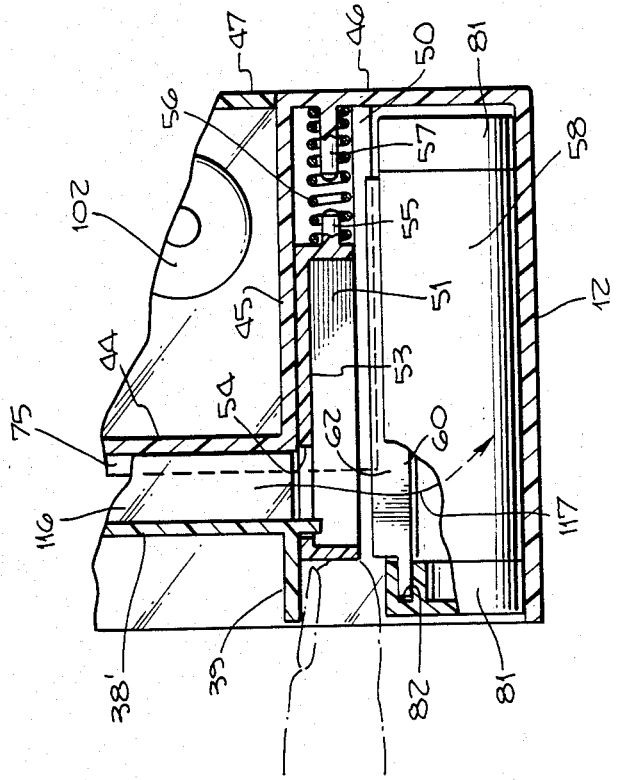
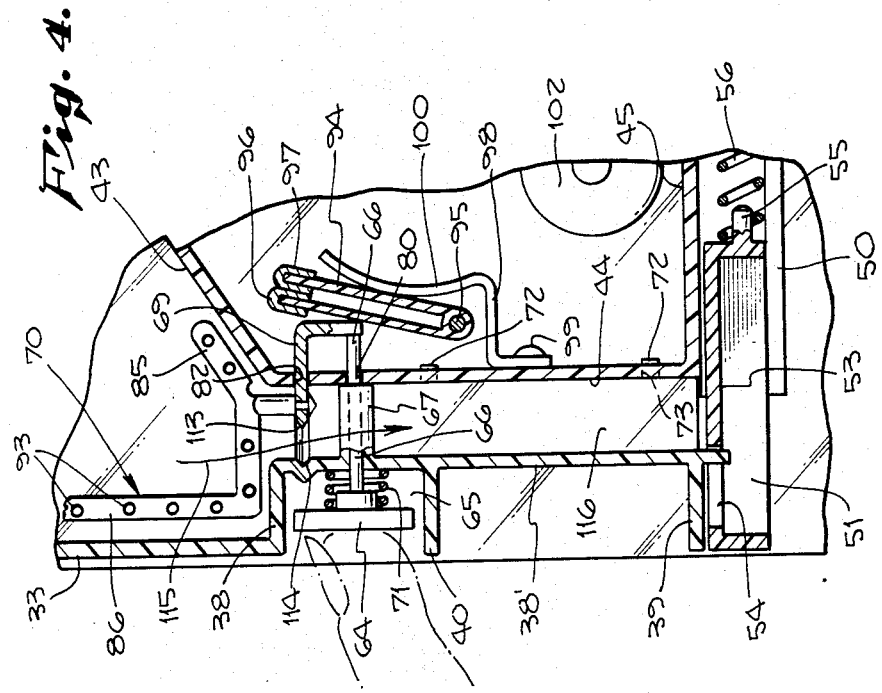

AUTOMATIC SPICE AND HERB DISPENSER

BACKGROUND OF THE INVENTION

1. Field of the Invention

The invention relates to herb and spice dispensers; and, more particularly, to a dispenser for dispensing automatically a measured amount of preselected herb or spice.

2. Description of the Prior Art

Storage of spices and herbs has long been a problem in those households where use thereof is popular. Such spices and herbs are usually stored in their individual containers, then removed by measuring spoons or the like when needed. The large number of bottles and jars and the like take up a considerable amount of room since they cannot be stacked vertically and it is difficult to read the contents of the individual bottles.

There is thus a need for an herb and spice dispenser wherein a plurality of such herbs and spices can be stored in an airtight manner a single housing with the contents clearly visible and identifiable. Such a container should be able to dispense a measured amount of such herbs and spices. Since certain herbs and spices, when stored, might clot together, such a dispenser should be able to break up any such clots during the dispensing operation.

SUMMARY OF THE INVENTION

It is an object of this invention to provide an herb and spice dispenser that automatically dispenses a premeasured amount of stored herbs and spices.

It is another object of this invention to carry out the foregoing object while breaking up any clots formed in the stored herbs and spices.

It is still further an object of this invention to dispense the preselected measured amount of herbs and spices to a removable container from which the same can be dispensed for cooking or other seasoning.

These and other objects are preferably accomplished by providing an automatic spice and herb dispenser which includes a housing having separate spice and herb storage compartments and a measured dispenser associated with each compartment. Each compartment also includes a vibrating device for breaking up the spices and herbs stored therein.

BRIEF DESCRIPTION OF THE DRAWING

FIG. 2 is a view taken along lines II—II of FIG. 1;

FIG. 3 is a view taken along lines III—III of FIG. 2;

FIG. 4 is a vertical side sectional view of a portion of the dispenser of FIGS. 1 to 3;

FIG. 5 is a view similar to FIG. 5 illustrating an operative feature thereof;

DESCRIPTION OF THE PREFERRED EMBODIMENT

Figure 1:
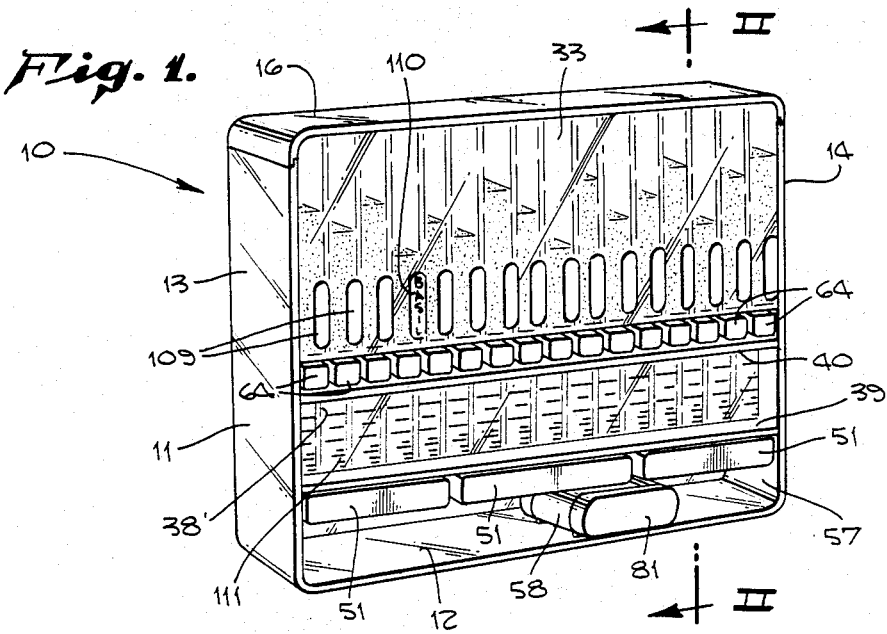
FIG. 1 is a front perspective view of a spice and herb dispenser in accordance with the teachings of the invention.
Figure 8:
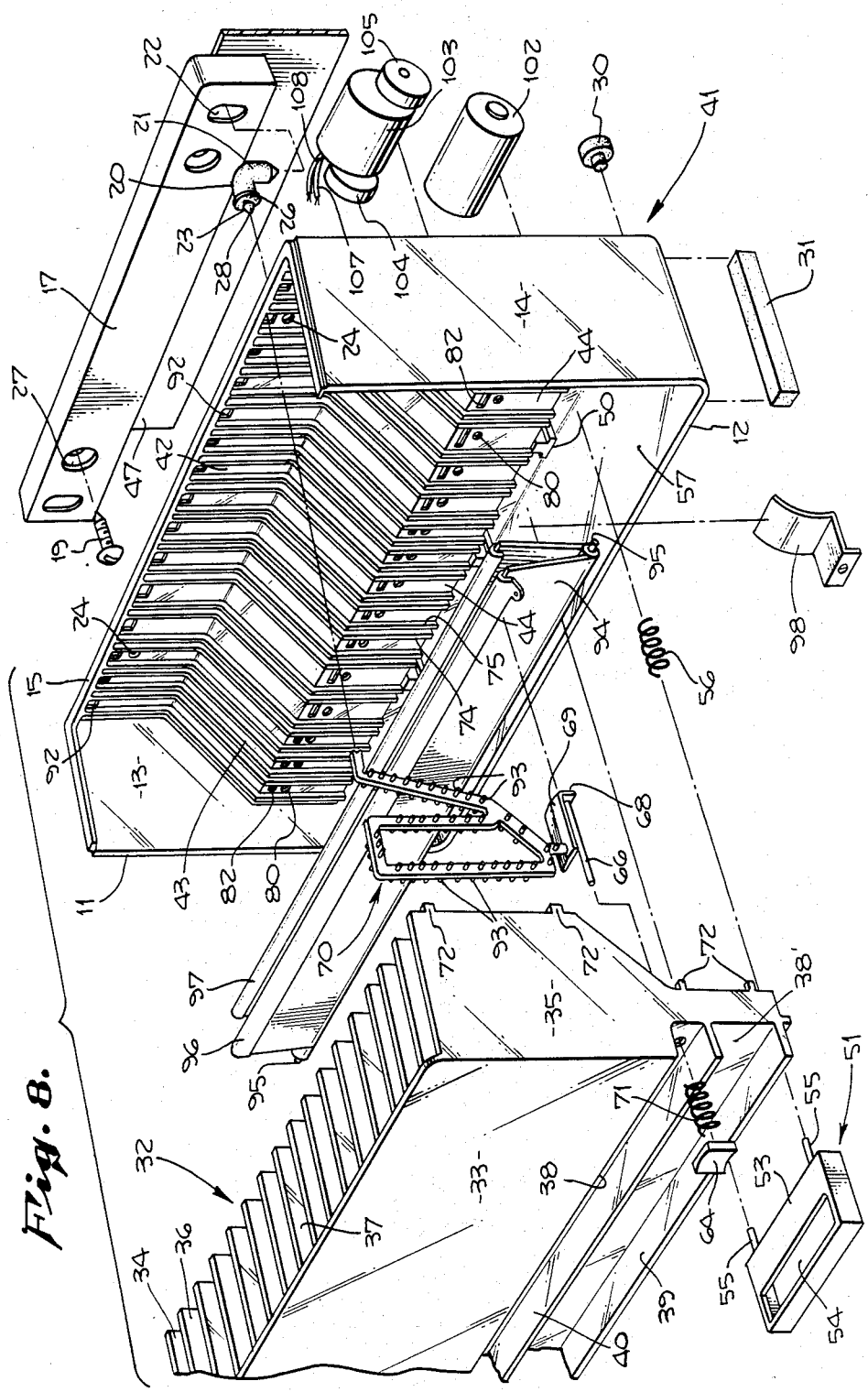
FIG. 8 is an exploded view of the dispenser of FIGS. 1 to 7.

Referring now to FIG. 1 of the drawing, a dispenser 10 is shown comprised of a main housing 11 having a bottom wall 12, a pair of upstanding side walls 13, 14 and a rear wall 15 (see FIG. 8). As seen in FIG. 8, walls 12-15 may be made of a single piece of injection molded plastic material or the like.

A top lid or cover 16 extends between the upper ends of side walls 13, 14 (FIG. 1) mating therewith and preferably snap-fitting thereto as is well known in the art.

As seen in FIGS. 2 and 8, a bracket 17 may be secured to a wall 18 or the like by one or more screws 19 extending through holes 27 in bracket 17. One or more resilient L-shaped bumper arms 20 is provided having one end 21 extending through an elongated opening 22 in bracket 17 and the other end 23 terminating in a point 28 having a shoulder 26 extending through an opening 24 in rear wall 15 with an enlarged flange 25 on the other side thereof so that wall 15 is disposed between flange 25 and shoulder 26. Thus, dispenser 10 is snap fit into bracket 17 and easily removable therefrom with a resilient connection therebetween. Bumper arm 20 may be of rubber or any other suitable resilient material.

At the bottom of dispenser 10, one or more bosses 29 (FIG. 2) is provided, each boss 29 receiving therein a resilient wall bumper 30 receivable in boss 29 and adapted to engage and bump against wall 18 as seen in FIG. 2. Thus, a resilient engagement with wall 18 is provided.

Also, as seen in FIGS. 2 and 8, one or more resilient feet 31 are provided on the bottom of bottom wall 12 at spaced locations therealong.

As seen in FIG. 8, dispenser 10 includes a subhousing 32 having a front wall 33 and spaced side walls 34, 35. A plurality of spaced section walls 36 extend between side walls 34, 35 dividing sub-housing 32 into a plurality of separate spaced individual compartments 37. As seen in FIG. 2, sub-housing 32 is closed along the bottom of compartments 37 by a bottom wall 38 which wall curves downwardly at wall 38' to a lower wall 39 spaced from wall 38. A partition wall 40 separates walls 38, 39 (see also FIG. 8).

The aforementioned side walls 13, 14 and rear wall 15 may be part of a second sub-housing 41 (FIG. 8) having a rear wall 42, a downwardly and inwardly sloping wall 43 and a bottom vertical wall 44 (see also FIG. 2). As seen in FIG. 2, the bottom wall 44 has connected thereto and extending rearwardly therefrom a bottom wall 45. This wall 45 intersects with a vertical rear wall 46 which interconnects with aforementioned bottom wall 12. A back plate 47 closes off the rear of sub-housing 41.

As seen in FIG. 3, a plurality of vertical spaced walls (two, walls 48, 49, being shown) extend along sub-housing 41 terminating at the bottom in T-shaped ends 50. These walls 48, 49 form, along with wall 45, spaced compartments into which slides 51 (FIG. 8) are slid (see also FIGS. 3 and 6). Thus, each slide 51 (such as three—FIG. 1) slides between the T-shaped ends 50, wall 45 and L-shaped end brackets 52 (FIG. 6) on the interior of side walls 13, 14. As seen in FIG. 8, these slides 51 are generally rectangular shaped, partly closed off at the top by top wall 53 leaving an elongated rectangular open area 54 therein. One or more pins 55 extend rearwardly from each slide 51, these pins 55 receiving thereon a coil spring 56 (FIG. 2) encircling at its other end a like pin 57 extending inwardly from rear wall 46. Thus, the slides 51 are normally biased to the FIG. 2 position.

Figure 6:
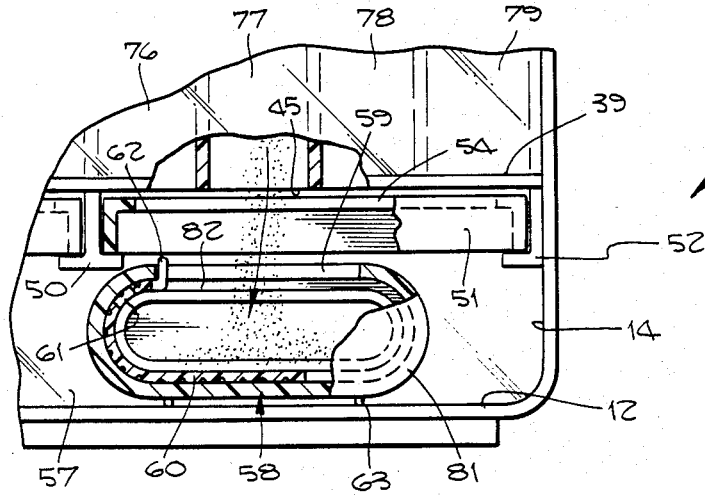
FIG. 6 is a front elevational partly sectional view of a portion of the dispenser of FIGS. 1 to 5.
Figure 7:
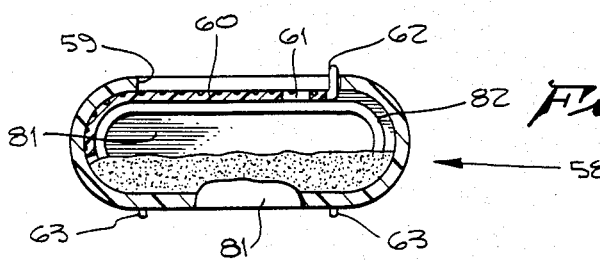
FIG. 7 is a vertical sectional view of one component of the dispenser of FIGS. 1 to 6.

The open area 57 below slides 51 serves to house a removable shaker 58 (see particularly FIG. 7). As seen in FIG. 1, shaker 58 can be moved laterally within area 57 for reasons to be discussed. Shaker 58 (FIG. 7) is preferably oblong in cross-section having an opening 59 at the top and a slidable closure lid 60 adapted to slide along the inner wall of shaker 58 from the FIG. 7 to the FIG. 6 position to thereby selectively open and close opening 59. A plurality of apertures 61 may be provided in lid 60 to shake out the contents thereof. Lid 60 may be transparent so that the contents of shaker 58 are visible. A tab or ear 62 connected to lid 60 allows easy opening and closing thereof. One or more spaced support legs 63 may be provided on the bottom of shaker 58 and wall 60 may ride on guide tracks or flanges 82 (FIG. 7) internally of removable end caps 81 (FIGS. 2 and 5). Also, apertures 61 may vary in size and may be adjustable in diameter, if desired.

As seen in FIGS. 2 and 4, a push button 64 is disposed in the open area 65 between walls 38 and 40. Button 64 has a shaft 66 extending rearwardly through an opening in wall 38', through boss 67 mounted between walls 38', 44. Shaft 66 passes through an opening 80 in lower wall 44 (FIG. 8). The terminal end of shaft 66 is connected to one end 68 (see FIG. 8) of an L-shaped plate 69. Plate 69 extends back out of slot 82 in wall 44 (FIG. 8) and is in turn secured to an agitator 70 to be discussed. A coil spring 71 surrounds shaft 66 (FIG. 2) between the head of push button 64 and wall 38'. Spring 71 normally biases button 64 to the FIG. 2 position. As seen in FIG. 4, plate 69 has a front end 113 adapted to enter a like configured cavity 114 in wall 38'. Plate 69, when in the FIG. 2 position, normally closes off the bottom of each compartment as will be discussed.

As seen in FIG. 4 and 8, the side walls 34, 35 and partition walls 36 of sub-housing 32 have a plurality of spaced tabs or ears 72 adapted to engage like configured slots 73 on the rear and lower walls 42, 44 with partition walls 36 entering between spaced flanges 74, 75 separating the same into spaced compartments (e.g., compartments 76 to 79) when sub-housing 32 is assembled to sub-housing 41. It is to be understood that partition walls 36 are configured similarly to flanges 74, 75. It is to be further understood that each compartment (e.g., all 16 compartments as seen in FIG. 1) has a push button 64 and related mechanism, including an agitator 70 disposed in each compartment.

Thus, as seen in FIG. 2, each agitator preferably includes a first generally horizontal leg portion 83 connected to plate via a pin portion 84 with a rearwardly and upwardly extending angled portion 85. A vertical portion 86 extends upwardly from portion 83 having a portion 87 at the top thereof extending generally normal therefrom and connected to a rearwardly downwardly extending angled portion 88. Portion 88 is in turn connected to a rearwardly and upwardly extending angled portion 89 connected to an upwardly angled portion 90 connected at the top via pin 91 to slot 92 in rear wall 15 above opening 24 (FIG. 8). A plurality of pins or fingers 93 extend laterally outwardly on both sides of agitator 70 for reasons to be discussed.

It can be seen, however, that each compartment, such as compartments 76 to 79 (see FIG. 3), has an agitator 70 therein generally configured to the interior of each compartment 76 to 79.

A V-shaped elongated contact holder 94 (FIG. 8), having a torsion rod 95 along the bottom thereof, is journalled for rotation between walls 13, 14 in suitable bosses or the like (not shown) mounted thereon. Metallic contact strips 96, 97, such as brass strips, extend along the top of each portion of holder 94. As seen in FIG. 2, strips 96, 97 are located adjacent plate 69 with contact 96 normally abutting thereagainst. One or more metallic L-shaped contact spring plates 98 (see also FIG. 8) are secured at one end via screw 99 (FIG. 2) to wall 44 and have curved upper plate portions 100 curving and abutting against plate holder 94. Plate 98 acts as a spring and may be selected to provide a relatively strong spring force. A conventional battery holder 101 is mounted above wall 45 in sub-housing 41 (FIG. 2) having a plurality, such as four, of conventional batteries 102 therein. A conventional eccentric motor 103, which may be a 6 volt DC motor (with 6 1½ volt batteries 102), having eccentric weights 104, 105 thereon (FIG. 8) is mounted in a motor holder 106 mounted to the bottom of wall 43 (FIG. 2). Suitable wire leads 107, 108 (FIG. 8) couple motor 103 electronically to batteries 102 and to the strips 96, 97. It is to be understood that, when strip 96 contacts strip 97, motor 103 is activated via batteries 102, the eccentrically mounted weights 104, 105 shaking and vibrating wall 43. Since plate 69 is coupled to wall 43, pin 84 and, thus, agitator 70, is also vibrated.

As seen in FIG. 1, the wall 33 is transparent so that the contents of each compartment are clearly visible from the exterior of dispenser 10. A label 109 having suitable indicia 110 thereon, to identify the contents of each individual compartment, is provided on the outer surface of wall 33. The outer surface of wall 38' may be provided with suitable indicia 111 (FIG. 3), such as horizontal lines, to indicate the various measurements (e.g., ⅛ tsp; ¼ tsp., etc.) with wall 38' also transparent. As also seen in FIG. 3, each individual compartment is closed off at the top by an individual cap or cover 112.

In operation, top cover 16 is removed and each cap 112 is opened so that each compartment may be filled. The spice or herb is dumped into each compartment related to the indicia 110 on label 109. Of course, these labels may be removable and easily attached or detached in any suitable manner. The cap 112 and top cover 16 are replaced, the batteries 102 installed and the dispenser 10 is either left free standing or mounted to wall 18 as heretofore discussed.

When it is desired to dispense a preselected herb or spice, the operator ascertains that shaker 58 is in position in space 57. The operator pushes button 64 moving shaft 66 against the bias of spring 71 simultaneously moving plate 69 rearwardly opening the individual compartment and allowing spices or herbs therein to fall downwardly, as indicated by arrow 115, to the lower compartment 116 below plate 69 and above tray 51 (between walls 38' and 44). At the same time, agitator 70 is vibrated as heretofore discussed due to the engagement of strips 96, 97 and actuation of motor 103 breaking up the spices and herbs in the selected compartments via fingers 93 and vibrating the entire dispenser 10. Button 64 is held until the preselected amount of herbs or spices falls into lower compartment 116, the quantity of which s determined via indicia 111 on the outside of wall 38'.

Release of button 64 disengages strips 96 and 97 and restores the same to the FIG. 2 position with plate 69 once again closing off the bottom of the preselected compartment and stopping the dispensing of the herbs or spices. As seen in FIGS. 2 and 4, the top wall 53 of slide 51 closes off the bottom of the lower compartment 116. These slides 51 straddle more than one such lower compartment.

As seen in FIG. 5, slide 51 is pushed inwardly against the bias of spring 56 which moves the open wall portion 54 under the lower compartment 116 allowing the herbs or spices to move downwardly therethrough in the direction of arrow 117. As seen in FIG. 6, at this point lid 60 of shaker 58 should be in the open position (FIG. 6) with the shaker 58 located under opening 54. The herbs or spices thus fall into shaker 58. The lid 60 may now be closed, shaker 58 may be removed from dispenser 10, and the contents shaken out of holes 61 to dispense the same. Of course, end cap 81 may be removed to dispense the entire contents thereout. Alternatively, holes 61 may be provided in the end cap 81, if desired. Release of slide 51 against its spring bias of course restores it to the FIG. 4 position normally closing off the bottom of the lower compartment 116.

It can be seen that we have disclosed a dispenser for storing spices and herbs in an airtight manner, then automatically dispensing preselected amounts when needed. The vibration of the agitator vibrates the entire dispenser and breaks up any clots or clumps due to caking of the spices of herbs allowing free movement downwardly of the herbs and spices. The lower compartment acts as a holding chamber until a preselected amount is visibly determined.

Any suitable materials may be used, such as plastic, for the main parts, rubber for the bumpers and feet, etc.

It can be seen that we have described a spice and herb dispenser which can store spices and herbs in an airtight manner, then dispense them when desired. Although we have disclosed a particular embodiment of the invention, the description thereof is for illustration only and the scope of the invention should be determined by the appended claims.

We claim:

1. A spice and herb dispenser comprising:
 a housing divided into a plurality of separate spaced independent compartments, each compartment having an upper storage chamber and a lower dispensing chamber, a movable wall separating the chambers closing off one chamber from the other;
 agitating means associated with each storage chamber for vibrating said dispenser and agitating the storage chamber and breaking up any spices or herbs stored in the storage chamber, said agitating means including an elongated agitating element extending from said lower dispensing chamber upwardly into and through a substantial portion of the spatial interior of the upper storage chamber in diverse multiple up and down directions therethrough with a plurality of spaced members extending into said upper chamber along said agitating element in a direction transverse to the longitudinal axis of said agitating element; and
 wall opening and closing means coupled to said wall for selectively opening and closing the same to thereby allow spices or herbs in said storage chamber to fall by gravity into said dispensing chamber.

2. In the dispenser of claim 1 including a slide mounted in said dispenser below said lower dispensing chamber normally closing off the bottom thereof.

3. In the dispenser of claim 2 wherein said slide includes a top wall normally closing off the bottom of said lower dispensing chamber with an opening in said slide adjacent said top wall, said slide being movable from a first position wherein said top wall normally closes off the bottom of said lower dispensing chamber to a second position wherein said opening in said slide coincides with the bottom of said lower dispensing chamber thereby allowing spices or herbs therein to fall past said slide.

4. In the dispenser of claim 3 wherein the slide is spring biased to its normal position.

5. In the dispenser of claim 3 including a removable shaker disposed in said dispenser below said slide, said shaker having a lid movable from first position closing off the interior of said shaker to a second position opening the same whereby, when said lid is in said second position and said shaker is disposed under said slide, herbs and spices falling past said slide can enter said shaker.

6. In the dispenser of claim 5 wherein said lid is transparent.

7. In the dispenser of claim 5 wherein a plurality of apertures are provided in said lid.

8. In the dispenser of claim 5 wherein said shaker includes a housing closed off at one end by a removable end cap.

9. In the dispenser of claim 1 including resilient means on said housing for resiliently mounting the same to a supporting surface.

10. In the dispenser of claim 1 wherein said wall includes a spring biased plate coupled to said agitating means, movement of said plate against its spring bias simultaneously opening the same and vibrating said dispenser.

11. In the dispenser of claim 10 wherein said agitating means is normally inactive and includes an eccentric motor coupled to said compartments and adapted to vibrate the same when activated.

12. In the dispenser of claim 1 wherein said agitating element is coupled at one end to said plate end at the other end to said housing.

13. In the dispenser of claim 12 wherein said agitating element extends first upwardly from said plate, across the top of said storage chamber, then downwardly back to said plate, then back upwardly and rearwardly to said wall.

14. In the dispenser of claim 12 wherein said spaced members include a plurality of outwardly extending elongated members extending along both sides of said agitating element.

15. In the dispenser of claim 12 wherein said agitating means includes a pair of normally separated electrical contacts, one of said contacts normally engaging said plate.

16. In the dispenser of claim 1 including indicia means associated with said upper storage chamber for indicating the contents thereof.

17. In the dispenser of claim 1 including indicia means associated with said lower dispensing chamber for indicating the quantity of herbs or spices therein.

18. A spice and herb dispenser comprising:
 a housing divided into a plurality of separate spaced independent compartments, each compartment having an upper storage chamber and a lower dispensing chamber, a movable wall separating the chambers closing off one chamber from the other;
 agitating means comprising an elongated agitating element extending through each upper storage chamber for vibrating said dispenser and agitating the storage chamber and breaking up any spices or herbs stored in the storage chamber; and wall opening and closing means coupled to said wall for selectively opening and closing the same to thereby allow spices or herbs in said storage chamber to fall by gravity into said dispensing chamber, said wall including a spring biased plate coupled to said agitating means, movement of said plate against its spring bias simultaneously opening the same and vibrating said dispenser, said agitating extending first upwardly from said plate, across the top of said storage chamber, then downwardly back to said plate, then back upwardly and rearwardly to said wall.

* * * * *